United States Patent
Eisenmann et al.

(10) Patent No.: US 6,907,330 B2
(45) Date of Patent: Jun. 14, 2005

(54) CONTROL SYSTEM FOR MOTOR VEHICLES

(75) Inventors: Joachim Eisenmann, Suessen (DE); Frank Huebner-Obenland, Esslingen (DE); Petra Kraft, Winnenden (DE); Karsten Rueter, Landshut (DE)

(73) Assignees: DaimlerChrysler AG, Stuttgart (DE); Lisa Draxlmaier GmbH, Vilsbiburg (DE)

( * ) Notice: Subject to any disclaimer, the term of this patent is extended or adjusted under 35 U.S.C. 154(b) by 0 days.

(21) Appl. No.: 10/426,977

(22) Filed: May 1, 2003

(65) Prior Publication Data

US 2003/0236596 A1 Dec. 25, 2003

(30) Foreign Application Priority Data

May 2, 2002 (DE) .......................... 102 19 439

(51) Int. Cl.[7] .......................... G06F 19/00; B60R 16/02
(52) U.S. Cl. .................... 701/36; 340/825.16; 340/459; 439/502; 439/724
(58) Field of Search ................ 701/36, 48; 340/825.16, 340/825.06, 459; 439/502, 724, 949; 307/10.1

(56) References Cited

U.S. PATENT DOCUMENTS 5,739,761 A * 4/1998 Kobayashi ................... 701/35
6,503,098 B2 * 1/2003 Aoki et al. .................. 439/502
2002/0181405 A1 * 12/2002 Ying .......................... 370/245

FOREIGN PATENT DOCUMENTS

| DE | 41 30 978 A1 | 9/1991 |
| DE | 42 23 935 C2 | 7/1992 |
| DE | 100 08 455 A1 | 2/2000 |
| DE | 100 44 934 A1 | 9/2000 |
| DE | 10141263 A1 | 3/2003 |
| WO | WO 98/33681 * | 1/1998 |
| WO | WO00/18614 | 4/2000 |
| WO | WO-01/62550 A1 | 8/2001 |

* cited by examiner

*Primary Examiner*—Thomas G. Black
*Assistant Examiner*—Ronnie Mancho
(74) *Attorney, Agent, or Firm*—Crowell & Moring LLP

(57) ABSTRACT

In a control system for motor vehicles having a plurality of functional subsystems, such as a passenger compartment controller, a telematics system, a drive controller and a chassis controller, each functional subsystem has a plurality of control devices, and a central databus. Control devices of different subsystems are combined, in accordance with their spatial arrangement in the vehicle, to form local modules and are connected to one another by means of a module bus. Each module bus is connected to the central databus by means of a module interface.

12 Claims, 3 Drawing Sheets

CONTROL SYSTEM FOR MOTOR VEHICLES

BACKGROUND AND SUMMARY OF THE INVENTION

This application claims the priority of German patent application 102 19 439.4, filed May 2, 2002, the disclosure of which is expressly incorporated by reference herein.

The invention relates to a control system for a motor vehicle having a plurality of functional subsystems, such as a passenger compartment controller, a telematics system, a drive controller and a chassis controller, each functional subsystem having a plurality of control devices, and a central databus.

Modern motor vehicles have numerous electronic components or control devices which are assigned, for example, to a functional subsystem—a chassis controller, drive controller, passenger compartment controller or telematics system. The control devices of a subsystem are generally distributed over the entire vehicle; for example control devices for the chassis controller may be situated at a front axle and rear axle, or telematics control devices, such as telephone, may be in the passenger compartment and a CD changer in the luggage compartment. A databus is used to interconnect the individual electronic control devices within a functional subsystem, with different bus systems being used in different functional subsystems, depending on the requirements. The bus lines of a subsystem therefore generally extend through large parts of the vehicle.

In order to ensure communication between functional subsystems (for example in order to transmit information from the chassis controller to the drive controller), all the subsystems are connected to a central gateway, which also serves as a diagnostics access point. Power is distributed in the motor vehicle separately from the transmission of data, using what are referred to as power points or distributors.

The publication R. Beck, C. Bracklo, G. Faulhaber, V. Seefried, "Backbone-Architektur: Vom zentralen Gateway zur systemintegrierenden Kommunikationsplattform" [Backbone Architecture: From the Central Gateway to the System-integrating Communications Platform], VDI Conference Elektronik im Kraftfahrzeug [Electronics in Motor Vehicles], September 2001, VDI Report 1646, page 277, discloses a network topology for motor vehicles in which superordinate communication between the individual functional subsystems such as chassis controller, drive controller, passenger compartment controller and telematics system, takes place on a central bus. The central databus including assigned interfaces with the functional subsystems is referred to as a backbone. Between each functional subsystem and the backbone there is a bidirectional interface. The provision of the backbone offers, inter alia, the possibility of using the operator-control and display systems jointly for a plurality of functional subsystems. Thus, in comparison to the solution described above which has a central gateway, the complexity of the interfaces is reduced. The backbone is concentrated locally. The control devices of the different functional subsystems are distributed over the entire vehicle and, depending on the requirements, are connected to one another by means of different bus systems.

The invention is intended to provide a control system of the type described above, in which expenditures on cabling are reduced.

Another object of the invention is to provide such a control system which can be fitted or removed at low cost.

To this end, the invention provides a control system in which control devices of different subsystems are combined, according to their spatial arrangement in the vehicle, to form local modules; and control devices within a module are connected to one another by means of a module bus. Each module bus in turn is connected to the central databus by means of a module interface.

By combining spatially adjacent control devices to form modules, the modules can be adapted in an optimum way to the spatial conditions. For example, up to 30 modules may be produced in a vehicle, including a left-hand front module, a right-hand front module, a rear module and four door modules. Control devices from various functional subsystems are combined in the modules. For example, the front module contains control devices from the fields of telematics, passenger compartment control, chassis control and drive control. Communication between the modules is provided by the central databus and the module interfaces. Each module interconnects the assigned control devices via the module bus, which in turn is connected to the central databus by means of the module interface. The module interface can also be referred to as an electronics center.

The central databus transmits data from all the modules using a common protocol, thus simulating the functional subsystems in a virtual fashion. On the one hand, the control system according to the invention can be extended flexibly and easily as it is easily possible to add further control devices in the modules or further modules.

Forming local modules permits short line lengths between the control devices of a module and the central databus. Moreover, the premounting of large modules is made easier, for example front-end, back-end, cockpit, roof lining, doors or engine, as, in contrast to the prior art, the modules of the electronic control system can be matched to the mechanical modules or bodywork modules. As data is in any case transmitted from all the control devices via the central databus, transparent communication between all the control devices involved is possible. Therefore, the use of data of one functional subsystem in another functional subsystem is possible without difficulty.

Because all the control devices are connected to the module buses via standardized interfaces, it is possible to fit or remove the control system. The module buses themselves are also connected to the module interfaces by means of standardized interfaces. A simple overall structure can be achieved by introducing hierarchy levels.

In one embodiment of the invention, the module interfaces and the central databus form a central module, creating a completely modular structure composed of the central module and local modules. Such a structure can easily be fitted, removed or repaired by exchanging individual modules.

In a refinement of the invention, the central module is arranged in the region of the floor or the roof of the motor vehicle. In this way, short line lengths of the module buses can be implemented as the module interfaces can be arranged in the vicinity of the individual modules on the floor of the vehicle or on the roof of the vehicle, for example in a bus-type vehicle.

According to a feature of the invention, the module interfaces have a housing with electronic components which can be plugged in and exchanged, so that they can be scaled in terms of their computing power and equipment. As result, the module interfaces can be adapted to the variable requirements. For example, module interfaces can be retrofitted when special equipment levels are provided, and removed when special equipment levels are taken out.

In another embodiment of the invention, each module interface is provided with separate electronic components that can be plugged in and exchanged, for an interface with the central databus, for processing and control tasks and for at least one interface with a module bus.

Because the individual functionalities of the module interface are provided on separate components which can be plugged in, a particularly well-adapted retrofitting is possible. Moreover, repair is also made easier and less expensive as only defective electronic components have to be exchanged, and not the entire module interface. Each module interface has precisely one interface with the central databus. However, a plurality of modules can be connected to one module interface.

In still another embodiment of the invention, each module interface has components for supplying power to the control devices of an assigned module. In this manner, the module interfaces can also take on the function of supplying power, and form what are referred to as electronics centers in the motor vehicle.

Power supply lines advantageously run in parallel with the central databus and with the module bus. Such a parallelism between the transmission of data and supply of power provides, on the one hand, motor vehicle cabling which is organized in an easily comprehensible way. Moreover, the flexibility of the control system is also increased, since when a module is exchanged, data lines and power lines can be exchanged at the same time.

In still another embodiment of the invention, at least one module interface is provided with at least one component which can be plugged in and exchanged, for supplying power to the control devices of an assigned module. These measures ensure a scaleable power supply or scaleable power electronics, so that the component for the power supply in the module interface is easily replaced when additional loads are provided. In order to adapt a power supply to additional electric loads, it is possible to provide additional components for the power supply as well as exchanging components.

In yet a further embodiment of the invention, the module interface has means for sensing the quantity of energy which is conducted via a power line to at least one control device of an assigned module, the at least one control device of the module has means for determining a quantity of energy which is taken up by the control device and/or a connected load, and for transmitting information about the taken-up quantity of energy to the module interface via the module bus, and the module interface has means for comparing the sensed quantity of energy conducted to the at least one control device of the module with the taken-up quantity of energy determined by the at least one control device.

In this manner, it is possible to detect leakage current in the supply line. This is particularly significant when the power supply voltage in the motor vehicle is raised (e.g., to 42V). For example, all the control devices or individual control devices with a high power drain of a module can be monitored. The power drain at the control device can be determined from available data, such as by measurement or calculation. For example, in an electric window lifter there may be data relating to the power drain when the window is raised or lowered, when starting up from the extreme positions takes place, and the like.

Other objects, advantages and novel features of the present invention will become apparent from the following detailed description of the invention when considered in conjunction with the accompanying drawings.

DETAILED DESCRIPTION OF THE DRAWINGS

Figure 1:
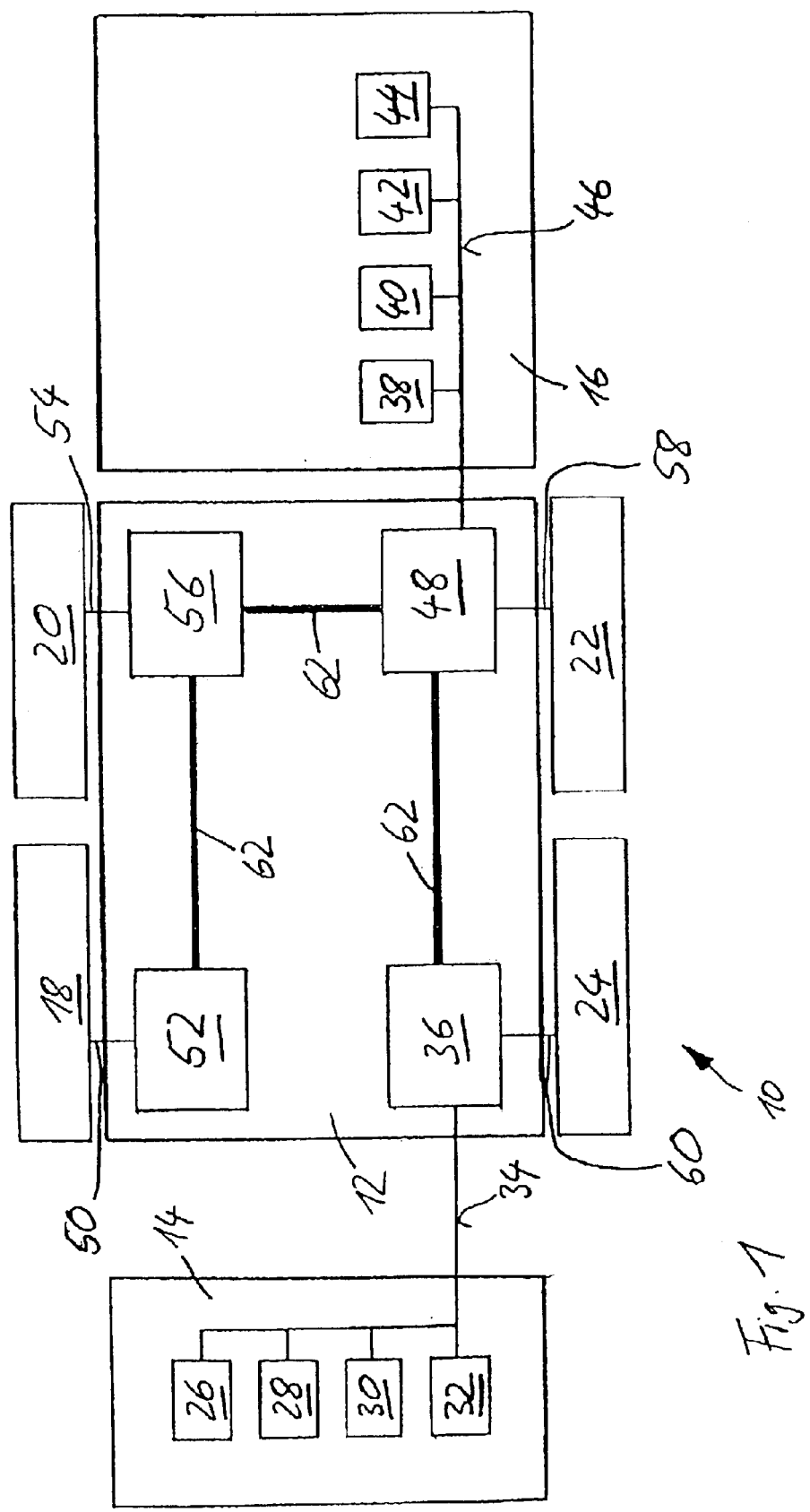
FIG. 1 is a schematic view of a control system for a motor vehicle according to a preferred embodiment of the invention.

In FIG. 1, a control system 10 for a motor vehicle has a central module 12, which is connected to a front module 14, a rear module 16, a right front door module 18, a right rear door module 20, a left rear door module 22 and a left front door module 24. The front module 14 contains a total of four control devices 26, 28, 30 and 32, which are assigned to different functional subsystems of the control system 10. That is, the control device 26 is thus assigned to a chassis controller, the control device 28 to a drive controller, the control device 30 to a telematics system and the control device 32 to a passenger compartment controller. Although the control devices 26 to 32 are assigned to different functional subsystems, they are located in proximity to one another, for example in the region of the shielding wall between the engine compartment and passenger compartment. The control devices 26 to 32 are connected to one another by means of a first module bus 34, which also connects them to a first module interface 36 in the central module 12.

The rear module 16 also has four control devices 38, 40, 42 and 44 which are assigned to different functional subsystems of the control system 10. The control device 38 is assigned to the chassis controller, the control device 40 to the passenger compartment controller and the control devices 42 and 44 to the telematics system. For example, the control device 38 controls the brakes on the rear axle, the control device 40 controls a sun blind on the rear window, the control device 42 constitutes a CD changer for a radio device and control device 44 constitutes a CD changer for a navigation system. The control devices 38 to 44 of the rear module 16 are connected to one another by means of a second module bus 46 and to a second module interface 48.

The right front door module 18 is connected to a third module interface 52 by means of a third module bus 50, while the right rear door module 20 is connected to a fourth module interface 56 by means of a fourth module bus 54. In addition to the front module 14, the left front door module 24 is connected to the first module interface 36 by means of a fifth module bus 60; and similarly the left rear door module 22 is also connected to the second module interface 48, by means of a sixth module bus 58. The module interfaces 36, 48, 52 and 56 communicate with one another by means of a central databus 62.

The central module 12 with the module interfaces 36, 48, 52 and 56 is arranged in the floor region of the motor vehicle. As shown in FIG. 1, the module interfaces 36, 48, 52 and 56 may each be arranged in the corner region of a passenger compartment floor of the motor vehicle. In this manner, the line lengths of the module buses 34, 46, 50, 54, 58 and 60 are kept short, because the module interfaces 36, 48, 52 and 56 are located in the vicinity of the front module 14, the left front door module 24, the left rear door module 22 and the rear module 16, the right rear door module 20 and the right front door module 18.

As shown in FIG. 1, the division of the devices of the control system 10 into the modules 14 to 24 is tailored to bodywork modules. The front module 14 can thus be premounted, for example, with the front part of a motor vehicle bodywork. After the front part is connected to the body of the bodywork all that is then necessary is to plug the first module bus 34 into the module interface 36. In the same way, the door modules 18 to 24 can be premounted with the respective assigned doors. After the doors have been mounted, all that is then necessary is to plug the respectively assigned module buses into the assigned module interfaces. This applies in the same way to the rear module 16.

Figure 2:
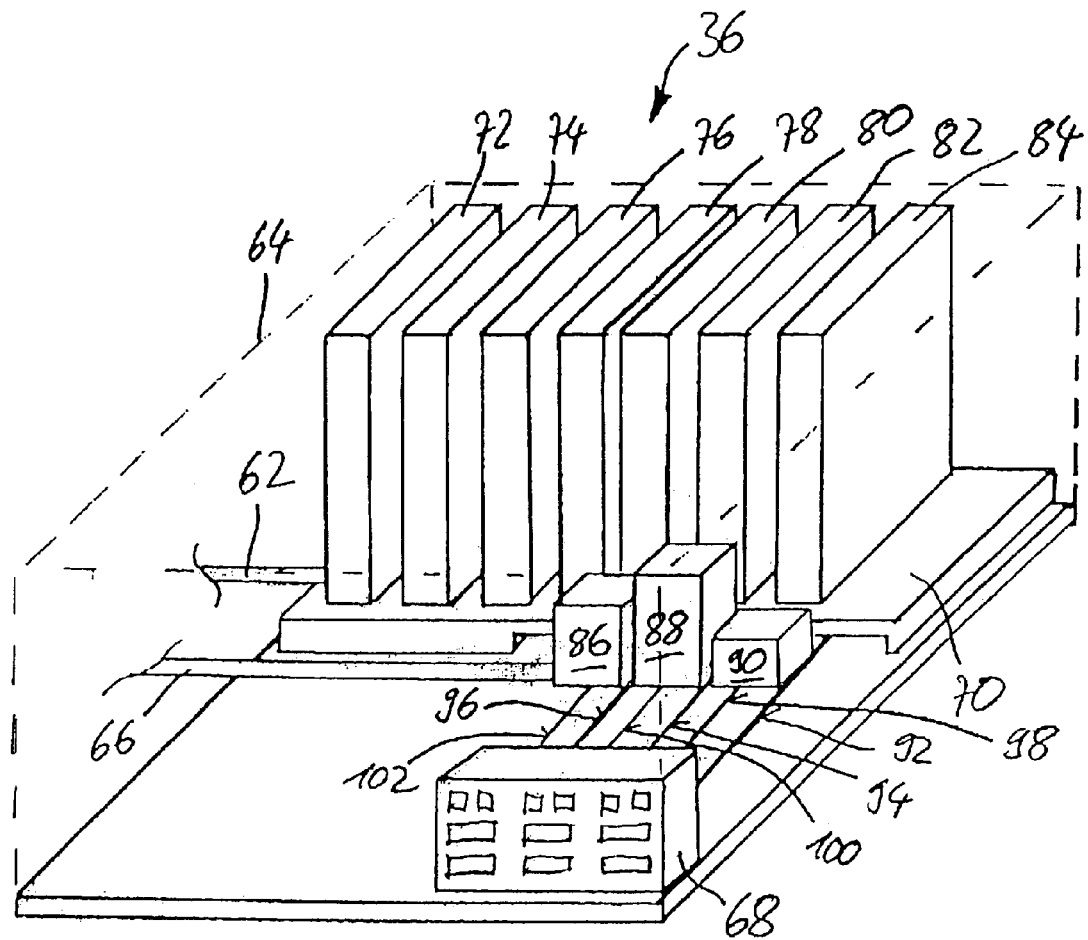
FIG. 2 is a schematic perspective view of a module interface in the control system in FIG. 1.

FIG. 2 shows an example of the first module interface 36, which forms what is referred to as an electronics center. The module interface 36 has a housing 64 whose upper section is represented only by dashed lines. The electronic components of the module interface 36 are arranged within the housing 64. The central databus 62 and a power line 66 are routed to the housing 64. An electrical plug-in connector 68 which is accessible from the outside of the housing 64 is provided for connecting module buses and power lines to the control devices of a module. The central databus 62 is connected to conductor tracks (not shown) and plug-in contacts on a base plate 70. A plurality of card-like electronic components 72, 74, 76, 78, 80, 82 and 84 are plugged into the plug-type contacts of the base plate 70. Conductor tracks and plug-in contacts of the base plate 70 (not shown) are connected to the power line 66 and to the components 72 to 84. Base plate 70 thus has, on the one hand, plug-type contacts and, on the other hand, wiring for distributing signals and power between the components 72 to 84, and a connection for incoming and outgoing data lines and power lines.

The individual functionalities of the module interface 36 are distributed among the plugged-in components 72 to 84. An interface with the central databus 62 is thus implemented by means of the component 72. The components 74, 76 and 78 make available computational power for the signal processing and control operations. Each of the components 80, 82 and 84 forms an interface with a module bus. As a result, up to three module buses can be connected to the module interface 36.

The power line 66 is connected to three power electronic components 86, 88 and 90, each of which supplies power to one of the modules connected to the module interface 36. The power electronic components 86, 88 and 90 are also provided in a form in which they can be plugged into the module interface 36.

According to the invention data lines and power lines run in parallel with one another. This is apparent, for example, from the line for the central databus 62 and the power line 66. Starting from the base plate 70, a total of three data lines 92, 94 and 96 lead to the electrical plug-type connector 68, each of the data lines 92 to 96 being provided for the connection to, in each case, one module bus which is to be connected. Starting from the power electronic components 86, 88 and 90, a respective power line 102, 100 or 98 leads to the electrical plug-type connection 68. The power supply to each module which is assigned to the module interface 36 is provided via the power lines 102, 100 and 98.

Figure 3:
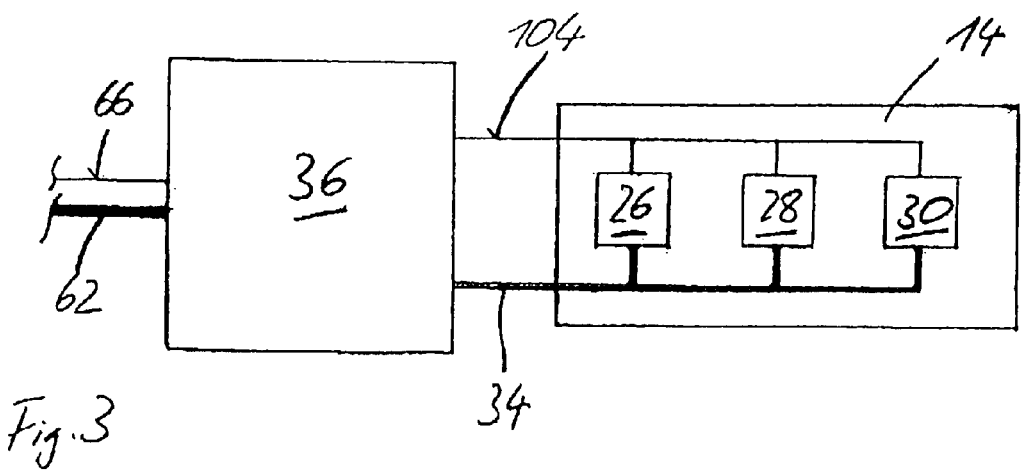
FIG. 3 is a schematic view which shows power lines and data lines of a module interface with a connected module of the control system in FIG. 1.

FIG. 3 is a schematic view of the module interface 36 with the connected front module 14. For simplicity, only three control devices 26, 28 and 30 are shown in the front module 14. The module interface 36 is connected to the central databus 62 and to the power line 66. The control devices 26, 28 and 30 of the front module 14 are supplied with power by the module interface 36 via a plurality of power lines 104. As has already been described, the control devices 26, 28 and 30 are connected to the module interface 36 by means of the first module bus 34.

Means for determining the quantity of power which is conducted to the individual control devices 26, 28 and 30 via the power lines 104 are provided in the module interface 36. For example, the quantity of energy which is fed to each of the control devices 26 to 30 can be measured. For this purpose, when there is a constant voltage of, for example, 42V, expediently only the current flowing across the power lines 104 is measured and stored. The control devices 26, 28 and 30 each determine the current taken up by them or by a connected load. This can be implemented either by measuring the current in the respective control device, by calculation or by accessing stored data. For example, in the case of a window lifter, the taken-up current can be measured or determined from stored data with reference to the current operating situation of the window lifter. Thus, for example, current values for starting up from a limit position, the normal upward movement, the normal downward movement and the like are stored.

The control devices 26, 28 and 30 transmit the current values determined by them to the module interface 36 via the module bus 34, where they are compared with the current values which were conducted to the individual control devices 26, 28 and 30 via the power lines 104. If these two current values differ from one another, it can be concluded that there is a creepage current or leak current in the power lines 104, and a warning message can be output. If the creepage current or leak current exceeds predefined values, it can be switched off.

In particular at higher operating voltages such as 42V, such an intelligent protection of the circuits constitutes a considerable advantage. For example, a circuit for an electric window lifter has to be protected with a fuse which also tolerates an increased power drain, such as when an iced-up window is unjammed. At a relatively high operating voltage of 42V, a leakage current due to a partial short-circuit in the power lines 104 can thus assume dimensions which could even result in a vehicle fire. This potential risk can be avoided by means of the invention.

Figure 4:
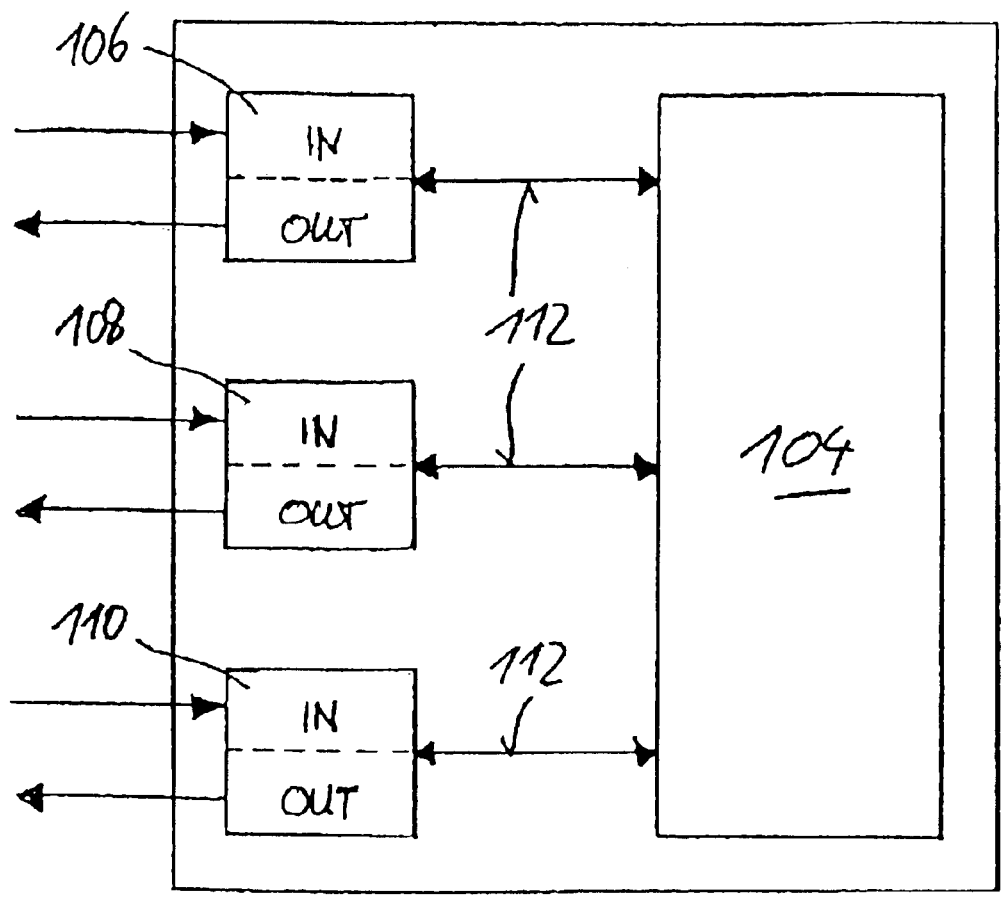
FIG. 4 shows the functional components in the control system of FIG. 1.

FIG. 4 shows the functional components of the central module 12, which can be implemented completely or partially by means of software. The central module 12 includes a central processing unit 104 and a plurality of gateways 106, 108 and 110, one such gateway being provided for each bus system which is connected to the central module. In the example in FIG. 4, it is thus possible for three different bus systems to be connected to the central module 12. For example, referring to FIG. 1, the module buses 50, 54, 58 and 60 for connecting the door modules 18, 20, 22 and 24 can form a first bus system. The module bus 34 for connecting the front module 14 forms a second bus system, and the module bus 46 for connecting the rear module 16 forms a third bus system.

Each gateway 106, 108 and 110 translates the protocol of the bus system connected to it, so that all the information can be understood and processed by the central processing unit 104. For outgoing information from the central processing unit 104 there is also a need for a gateway which translates the information from the central processing unit 104 into the protocol of the connected bus system. As the connected modules generally communicate bidirectionally, the gateways 106, 108 and 110 are each configured bidirectionally. An internal protocol, which is indicated by the double arrows 112, is used between the gateways 106, 108 and 110 and the central processing unit 104.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A control system for a motor vehicle having a central databus and a plurality of functional subsystems, each subsystem including a plurality of control devices, wherein:
   the control devices have means for calculating control data by accessing stored data;
   control devices of different subsystems are combined to form local modules, according to spatial arrangement of said control devices in the vehicle;
   the control devices within a module are connected to one another via a module bus; and
   each module bus is connected to the central databus via a module interface;
   each module interface has a housing that encloses electronic components; and
   each module interface is connected to the central databus by a second interface, and is connected to an associated module bus by a third interface.

2. The control system according to claim 1, wherein the module interfaces and the central databus are combined to form a central module which is disposed at a central location in the vehicle.

3. The control system according to claim 1, wherein the central module is arranged at a floor or a roof of the motor vehicle.

4. The control system according to claim 1, wherein each of the module interfaces comprises a housing in which electronic components can be plugged in and exchanged.

5. The control system according to claim 1, wherein each module interface has components for supplying power to the control devices of an assigned module.

6. The control system according to claim 5, wherein power supply lines run parallel to the central databus and the module bus.

7. The control system according to claim 5, wherein at least one module interface has at least one component that can be plugged in and exchanged, for supplying power to the control devices of an assigned module.

8. A control system for a vehicle, comprising:
   a plurality of control subsystems, each having a plurality of controllers for vehicle components, said controllers being situated at diverse locations in the vehicle, and each of said controllers having means for calculating control data by accessing stored data; and
   a central databus; wherein,
   said controllers are grouped and incorporated into a plurality of local modules, based on location of said controllers in the vehicle, each such module including controllers of different subsystems, that are situated within a particular vehicle location;
   each local module includes a local module databus for communication between controllers in the local module;
   each local module includes a module interface coupled to the local module databus;
   each module interface is connected to the central databus, whereby controllers of every control subsystem can communicate with other controllers of other subsystems; and
   the module interfaces and the central databus are combined to form a central module, which is disposed at a central location in the vehicle.

9. The control system according to claim 8, wherein each module interface has separate electronic components for providing an interface with the central databus, for processing and control tasks and for providing at least one interface with a module bus, which components can be plugged in and exchanged.

10. A method for controlling components in vehicle subsystems in a vehicle having a plurality of subsystems, each of which subsystems includes a plurality of controllers situated at dispersed locations within the vehicle, said method comprising:
    grouping said controllers according to their location within the vehicle, and combining controllers of each group to form a local module, each such module including controllers from different subsystems that are situated within a particular vehicle location, and each controller having means for calculating control data by accessing stored data;
    communicating among controllers within a particular module via a module databus;
    coupling each module databus to a central databus via a module interface; wherein
    each module interface has a housing that encloses electronic components; and
    each module interface is connected to the central databus by a second interface, and is connected to an associated module bus by a third interface.

11. A control system for a motor vehicle have a central databus and a plurality of functional subsystems, each including a plurality of control devices, and a central databus, wherein:
    the control devices have means for calculating control data by accessing stored data;
    control devices of different subsystems are combined to form local modules, according to spatial arrangement of said control devices within the vehicle;
    the control devices within a module are connected to one another via a module bus;
    each module bus is connected to the central databus via a module interface; and each module interface has components for supplying power to the control devices of an assigned module.

12. The control system according to claim 11, wherein:
    the module interface includes means for sensing a quantity of energy conducted via a power line to at least one control device of an assigned module;
    the at least one control device of the module has means for determining a quantity of energy taken up by the control device and/or a
    connected load, and for transmitting information about the taken-up quantity of energy to the module interface via the module bus; and
    the module interface includes means for comparing the sensed quantity of energy conducted to the at least one control device of the module with the taken-up quantity of energy determined by the at least one control device.

* * * * *